United States Patent
Gutierrez et al.

(10) Patent No.: US 9,660,968 B2
(45) Date of Patent: May 23, 2017

(54) METHODS AND APPARATUS FOR CONVEYING A NONCE VIA A HUMAN BODY COMMUNICATION CONDUIT

(71) Applicant: Intel Corporation, Santa Clara, CA (US)

(72) Inventors: Christopher N. Gutierrez, Zionsville, IN (US); Jianqing Zhang, Santa Clara, CA (US); Manoj R. Sastry, Portland, OR (US); Anand S. Konanur, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 14/865,147

(22) Filed: Sep. 25, 2015

(65) Prior Publication Data

US 2017/0093822 A1    Mar. 30, 2017

(51) Int. Cl.
*H04L 9/32* (2006.01)
*H04L 29/06* (2006.01)
*H04W 12/04* (2009.01)
*H04W 4/00* (2009.01)
*H04B 13/00* (2006.01)

(52) U.S. Cl.
CPC .......... *H04L 63/061* (2013.01); *H04W 4/008* (2013.01); *H04W 12/04* (2013.01); *H04B 13/005* (2013.01)

(58) Field of Classification Search
CPC .... H04L 63/061; H04W 4/008; H04W 12/04; H04B 13/005
See application file for complete search history.

(56) References Cited

U.S. PATENT DOCUMENTS

| | | | |
|---|---|---|---|
| 5,796,827 A | 8/1998 | Coppersmith et al. | |
| 8,626,139 B2 | 1/2014 | Kirkup et al. | |
| 8,688,986 B2 | 4/2014 | Kohlenberg et al. | |
| 2004/0025017 A1* | 2/2004 | Ellison | H04L 63/0861 713/168 |
| 2008/0141352 A1* | 6/2008 | Lindsley | H04L 63/083 726/6 |
| 2009/0167487 A1 | 7/2009 | Shah et al. | |
| 2009/0169018 A1 | 7/2009 | Deisher | |

(Continued)

OTHER PUBLICATIONS

International Search Report and Written Opinion received for PCT Patent Application No. PCT/US2016/044042, mailed on Oct. 31, 2016, 13 pages.

(Continued)

*Primary Examiner* — Techane Gergiso
(74) *Attorney, Agent, or Firm* — Barre Law Firm, PLLC

(57) ABSTRACT

In a method for enabling devices to communicate securely, a first device dynamically generates a human body nonce (HBN) and then sends that HBN to a second device via a human body communication conduit (HBCC). After sending the HBN from the first device to the second device, the first device uses the HBN to establish security for an over-the-air (OTA) communication session between the first device and the second device. For instance, the first device may derive a key, based at least in part on the HBN, and the first device may use the key to encrypt communications to be sent OTA between the first device and the second device. Other embodiments are described and claimed.

21 Claims, 6 Drawing Sheets

(56) References Cited

U.S. PATENT DOCUMENTS

| | | | |
|---|---|---|---|
| 2009/0271622 A1* | 10/2009 | Singh | H04L 9/3273 |
| | | | 713/168 |
| 2009/0307496 A1* | 12/2009 | Hahn | H04L 63/0428 |
| | | | 713/171 |
| 2010/0082983 A1 | 4/2010 | Shah et al. | |
| 2011/0053558 A1 | 3/2011 | Teague | |
| 2011/0118030 A1 | 5/2011 | Walley et al. | |
| 2011/0250837 A1 | 10/2011 | Hwang et al. | |
| 2015/0089590 A1* | 3/2015 | Krishnan | H04L 63/08 |
| | | | 726/3 |
| 2015/0319151 A1* | 11/2015 | Chastain | H04W 12/04 |
| | | | 713/171 |

OTHER PUBLICATIONS

Microchip Technology Inc., "Microchip PIC16(L)F1826/27", Data Sheet, Retrieved from http://ww1.microchip.com/downloads/en/DeviceDoc/41391D.pdf, Sep. 2015, 406 pages.

Microchip Technology Inc., "BodyCom Development Kit User's Guide", Retrieved from http://ww1.microchip.com/downloads/en/DeviceDoc/40001649C.pdf, Sep. 2015, 54 pages.

Austriamicrosystems, "AS3900", Data Sheet, Copyright 1997-2010, 59 pages.

BibSonomy, "EEG-based Speech Recognition Impact of Temporal Effects", Retrieved from http://www.bibsonomy.org/bibtex/210c31f2529d22fa0b8eb04a987abb660/dblp, Retrieved on May 22, 2014, 2 pages.

Porbadnigk et al., "EEG-based Speech Recognition: Impact of Temporal Effects", Cognitive Systems Lab, University of Karlsruhe, Retrieved from http://csl.anthropomatik.kit.edu/downloads/Biosignals_paper114.pdf, Retrieved on May 22, 2014, 6 pages.

Wikipedia, "Bluetooth", Retrieved from https://en.wikipedia.org/wiki/Bluetooth, Retrieved on Aug. 28, 2015, 24 pages.

Sparkfun, "Bluetooth Basics", Retrieved from https://learn.sparkfun.com/tutorials/bluetooth-basics/how-bluetooth-works, Retrieved on Aug. 29, 2015, 4 pages.

Apple Support, "Bluetooth glossary", Retrieved from https://support.apple.com/en-eg/HT201172, Retrieved on Aug. 29, 2015, 3 pages.

Microchip Technology Inc., "Embedded Security BodyCom Technology", Retrieved from http://www.microchip.com/pagehandler/en-us/technology/embeddedsecurity/technology/bodycom.html, Retrieved on Sep. 17, 2015, 2 pages.

Analog Devices, "Analog Dialogue: Capacitive Sensors", Retrieved from http://www.analog.com/library/analogdialogue/archives/40-10/cap_sensors.html, Retrieved on May 14, 2014, 10 pages.

BBC News, "Disney develops 'magical' device to make fingertips sing", Retrieved from http://www.bbc.com/news/technology-24031948, Retrieved on Apr. 10, 2014, 2 pages.

Intel Free Press, "Investigating Human Body Communications", Retrieved from http://www.intelfreepress.com/news/investigating-human-body-communications-wearables/8576/, Sep. 5, 2014, 3 pages.

The Guardian, "Kiss and tell", Retrieved from http://www.theguardian.com/technology/2005/mar/17/gadgets.onlinesupplement, Retrieved on Apr. 10, 2014, 3 pages.

NewScientist, "Magic microphone lets you whisper with your fingertips", Retrieved from http://www.newscientist.com/article/dn24169-magic-microphone-lets-you-whisper-with-your-fingertips.html#.U0cLqlwo5EY, Retrieved on Apr. 10, 2014, 2 pages.

University of California, San Diego, "Magnetic Fields Provide a New Way to Communicate Wirelessly", Retrieved from http://www.jacobsschool.ucsd.edu/news/news_releases/release.sfe?id=1807, Retrieved on Sep. 17, 2015, 3 pages.

Tatourian, "Your Future Smart Wristband", Retrieved from http://tatourian.com/2014/04/03/your-future-smart-wristband/, Retrieved on Jun. 4, 2014, 35 pages.

Disney Research, "Touché: Enhancing Touch Interaction on Humans, Screens, Liquids, and Everyday Objects", May 5-10, 2012, 10 pages.

Sydir et al., "Human Body Communication Device with Secure Access", U.S. Appl. No. 14/751,233, filed Jun. 26, 2015, 19 pages.

Bluetooth SIG, Inc., "Bluetooth Specification Version 4.2", Retrieved from https://www.bluetooth.org/DocMan/handlers/DownloadDoc.ashx?doc_id=286439, Dec. 2, 2014, pp. 1-1000.

Bluetooth SIG, Inc., "Bluetooth Specification Version 4.2", Retrieved from https://www.bluetooth.org/DocMan/handlers/DownloadDoc.ashx?doc_id=286439, Dec. 2, 2014, pp. 1001-2000.

Bluetooth SIG, Inc., "Bluetooth Specification Version 4.2", Retrieved from https://www.bluetooth.org/DocMan/handlers/DownloadDoc.ashx?doc_id=286439, Dec. 2, 2014, pp. 2001-2772.

* cited by examiner

METHODS AND APPARATUS FOR CONVEYING A NONCE VIA A HUMAN BODY COMMUNICATION CONDUIT

TECHNICAL FIELD

This disclosure describes embodiments related to computer security. In particular, these embodiments relate to methods and apparatus for conveying a device pairing nonce via a human body communication conduit.

BACKGROUND

When devices communicate with each other wirelessly or over the air (OTA), unauthorized devices may be able to receive or intercept those OTA communications. However, to prevent unauthorized devices from being able to use any intercepted communications, the authorized devices may encrypt those communications. This encryption process may involve one or more shared secrets. A shared secret is data that is known to the authorized devices only, and not known to the unauthorized devices.

For instance, if a headset and a smart phone both support the wireless protocols known by the trademark "BLUETOOTH," those devices may use a so-called "pairing" process to create shared secret keys, and those keys may then be used as part of the encryption process for the data that is subsequently communicated OTA between the phone and the headset. More information about Bluetooth (BT) may be found in the Bluetooth Specification Version 4.2 from Dec. 2, 2014 (the BT Spec). A related set of technologies is known by the name or trademark BLUETOOTH LOW ENERGY. Bluetooth Low Energy may also be referred to as Bluetooth LE (BLE) or Bluetooth Smart.

In one conventional implementation, the manufacturer of a headset may assign a static personal identification number (PIN) to the headset. To pair the headset with a phone, the user may be required to enter the PIN of the headset into the phone. This approach may be referred to as static-PIN-based pairing. Alternative approaches may involve different kinds of devices. In addition, alternative approaches may require the user to enter other kinds of PINs or identifiers to verify that the user wants specific devices to be paired with each other. Those approaches may require the user to enter a particular identifier during the pairing process in order to discourage or defeat so called "man in the middle" (MITM) attacks.

Other approaches may not provide any protection against MITM attacks. For instance, in the BT association model known as "Just Works," the devices complete the pairing process without exchanging or verifying any PINs.

The present disclosure describes an approach to pairing that may discourage or defeat MITM attacks without requiring the user to enter any alphanumeric identifiers. As described in greater detail below, this approach may use a nonce that is conveyed from a first device to a second device via a human body communication conduit (e.g., via human touch) during the pairing process. This nonce may be referred to as a human body nonce. The devices may use such human body nonces to achieve mutual authentication and to establish a secure communication connection. A device or collection of devices which utilize this approach may be referred to a human body nonce system.

DESCRIPTION OF EMBODIMENTS

According to the present disclosure, a distributed data processing system may include two or more data processing devices with features for conveying nonces via a human body communication conduit (HBCC). As indicated above, such a system may be referred to as a human body nonce (HBN) system.

Figure 1:
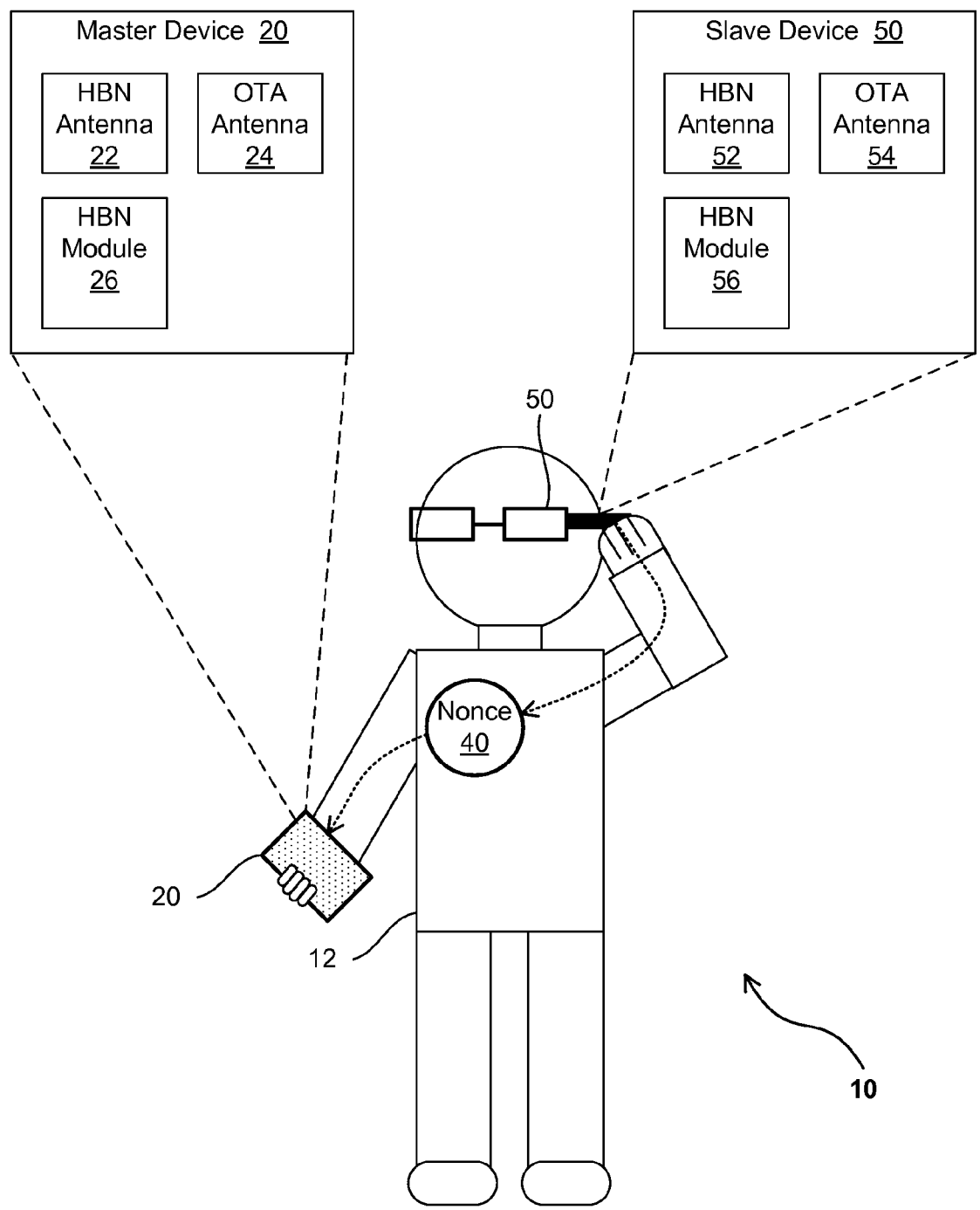
FIG. 1 is a block diagram of an example human body nonce system.

FIG. 1 is a block diagram of an example HBN system 10. In the embodiment of FIG. 1, HBN system 10 includes a smart phone 20 and a pair of smart glasses 50 that include optical head-mounted display (OHMD) technology. Smart phone 20 may be configured to operate as a master device 20. Smart glasses 50 may be configured to operate as a slave device 50. FIG. 1 shows a human user 12 wearing smart glasses 50 and holding smart phone 20. In particular, as described in greater detail below, user 12 is shown touching an HBN antenna 52 on smart glasses 50. For purposes of this disclosure, an HBN antenna may also be referred to as an HBN spot or a touch spot.

For any particular device, the HBN antenna may be placed in a location that conforms to natural interactions between the user and that device. For example, the HBN antenna may be built into the touch surface of a smartphone or along the outer edges. Consequently, if the user is touching the smartphone's screen or holding the device in their hand, the device can communicate with other devices via the HBCC of the user. Similarly, a smartwatch may strategically place the HBN antenna on the wrist strap, on the surface that is touching the user's skin. Other form factors may use other placements.

As described in greater detail below, as part of a pairing process, an HBN module 56 in slave device 50 may generate a nonce 40, and HBN module 56 may then use HBN antenna 52 to transmit nonce 40 to master device 20. In particular, as illustrated in FIG. 1 by the dotted arrows leading (a) from slave device 50 to nonce 40 and (b) from nonce 40 to master device 20, slave device 50 may transmit nonce 40 to master device 20 via the body of user 12. Accordingly, nonce 40 may also be referred to as HBN 40. Master device 20 may also include an HBN antenna 22 and a HBN module 26. HBN module 26 may use HBN antenna 22 to receive nonce 40 from slave device 50 via an HBCC. Likewise, master device 20 may send an HBN to slave device 50. Master device 20 and slave device 50 may then use those nonces to complete the pairing process via an OTA channel. After successfully completing the pairing process, master device 20 and slave device 50 may then use respective OTA antennas 24 and 54 for secure communications.

OTA antennas and their related communications hardware may provide for greater bandwidth than HBCCs. In addition, the devices may be configured to use the OTA antennas for most communication tasks. Consequently, the communications that are sent via the OTA communications may be referred to as in-band communications, and OTA communication channels may be referred to as in-band channels, etc. By contrast, the HBCC communications may be referred to as out-of-band or OOB communications, OOB communication channels may be referred to as OOB channels, and so forth.

As described in greater detail below, master device 20 and slave device 50 may use OOB pairing via an HBCC as an auxiliary method for mutual authentication during device pairing. That auxiliary method may provide an optimum balance between (a) protection against MITM attacks and (b) a good user experience.

For purposes of this disclosure, a nonce is an arbitrary, dynamically generated number or value that is sent from a first data processing device to a second, to enable the second device to securely communicate with the first. For instance, as described in greater detail below, the two devices may each generate a nonce, and the two devices may use those nonces to authenticate themselves to each other. In addition or alternatively, the devices may use the nonces to generate one or more keys, and the devices may then use one or more of those keys to securely communicate with the each other. Thus, the nonces may serve as shared secrets.

Data (e.g., a nonce) that is used to generate a key may be also referred to as key material. Devices may use random number generators to generate random numbers to be used as nonces, for instance. Alternatively, a device may combine two or more values to form a nonce. For instance, the first device may combine a random number and a timestamp value to form a nonce. For purposes of this disclosure, terms like "random numbers" should be understood as including pseudo-random numbers, unless the context clearly requires otherwise.

Master device 20 and slave device 50 may use any suitable technology to communicate via the HBCC. For instance, in one embodiment, master device 20 and slave device 50 may use transceivers like those described by austriamicrosystems AG (ams AG) under the name or trademark AS3900. Such transceivers may be referred to as HBN transceivers. HBN transceivers, HBN antennas, and related components may be referred to in general as HBN communications hardware. The HBN communication hardware may include built-in data link layer control (including control for the media access control (MAC) sublayer) for communication through the HBCC. For example, the link layer may handle data transfer and may raise an interrupt to the processor when data is ready. The processor may respond to such an interrupt by retrieving the data from a buffer in the HBN communication hardware. The link layer may also handle multiple slave devices talking to a master device.

Figure 2:
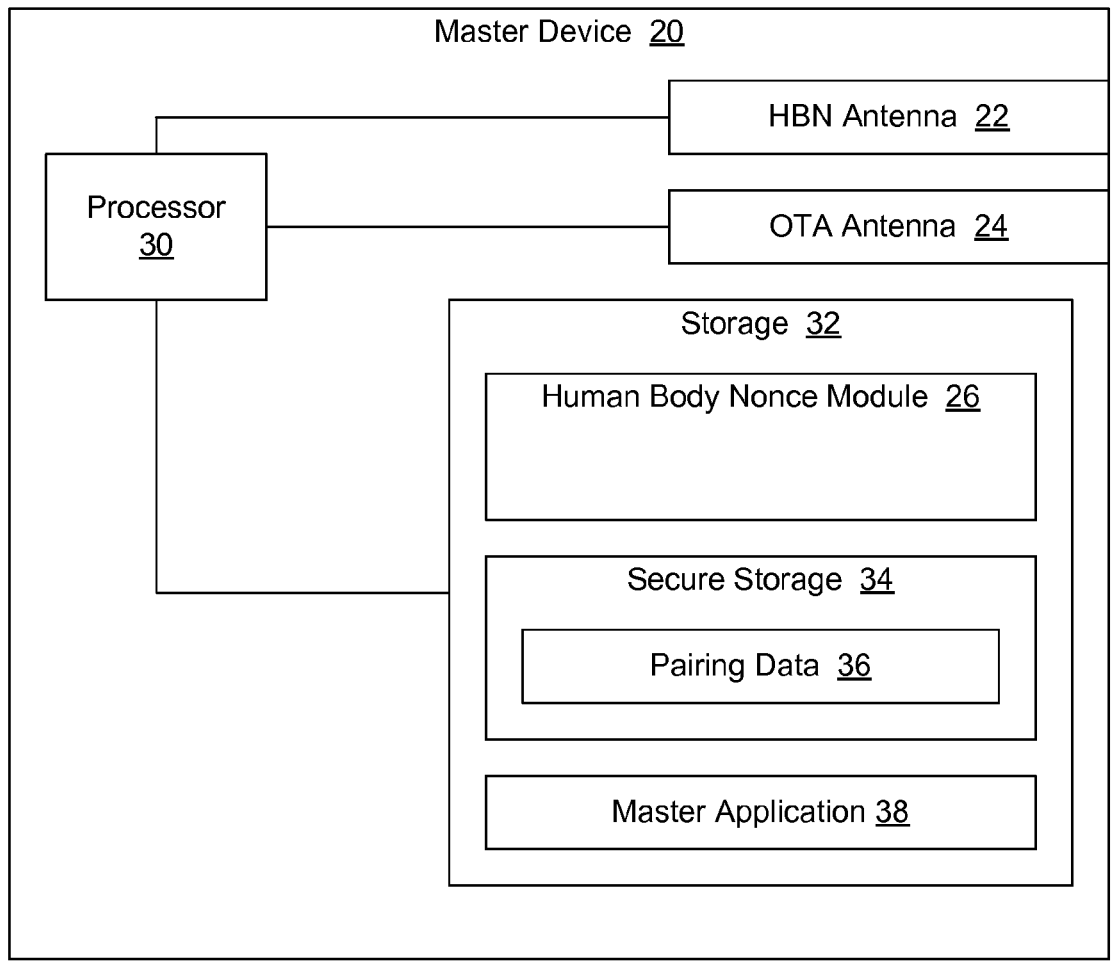
FIG. 2 is a block diagram illustrating the master device of FIG. 1 in greater detail.

FIG. 2 is a block diagram illustrating master device 20 in greater detail. In the embodiment of FIG. 2, master device 20 includes a processor 30 in communication with hardware components such as HBN antenna 22, OTA antenna 24, and one or more storage devices 32. The hardware components may also include an HBN transceiver and various other components (e.g., a touch screen, a microphone, a speaker, a motion sensor, etc.) in communication with processor 30. Storage 32 may include software and other data for communications, including HBN module 26, as well as a section of secure storage 34 to contain derived keys and other key materials, such as a list of every HBN ever received by HBN module 26. Storage 32 may also include one or more applications which allow master device 20 to control other devices, such as slave device 50. In the embodiment of FIG. 2, such an application is represented by master application 38.

Figure 3:
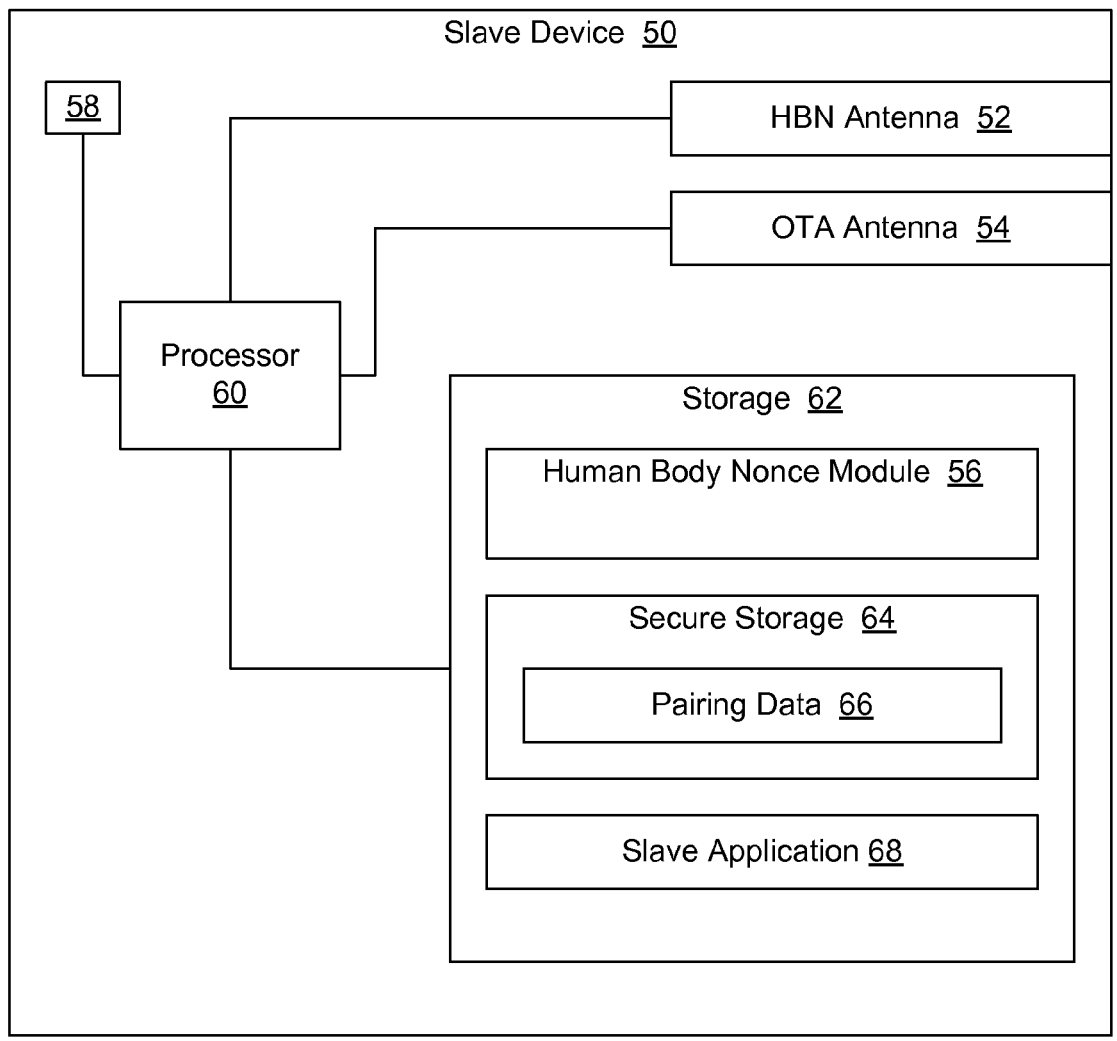
FIG. 3 is a block diagram illustrating the slave device of FIG. 1 in greater detail.

FIG. 3 is a block diagram illustrating slave device 50 in greater detail. Like master device 20, slave device 50 may include a processor 60 in communication with hardware components such as HBN antenna 52, OTA antenna 54, and one or more storage devices 62. The hardware components may also include a pairing button 58 that may be used to trigger the pairing, an HBN transceiver, and various other components (e.g., an OHMD) in communication with processor 60. Storage 62 may include software and other data for communications, including HBN module 56, as well as a section of secure storage 64 to contain derived keys and other key materials, such as a list of every HBN ever received by HBN module 56. Storage 62 may also include one or more applications which allow slave device 50 to cooperate with other devices, such as master device 20. In the embodiment of FIG. 3, such an application is represented by slave application 68.

As indicated above, a device may include a pairing button for triggering the pairing process. In addition or alternatively, a device may trigger the pairing process in response to other kinds of user input, such as shaking detecting by an accelerometer in the device, contact or pressure detected on a touch screen or a pressure sensor on the device, etc.

Figure 4A:
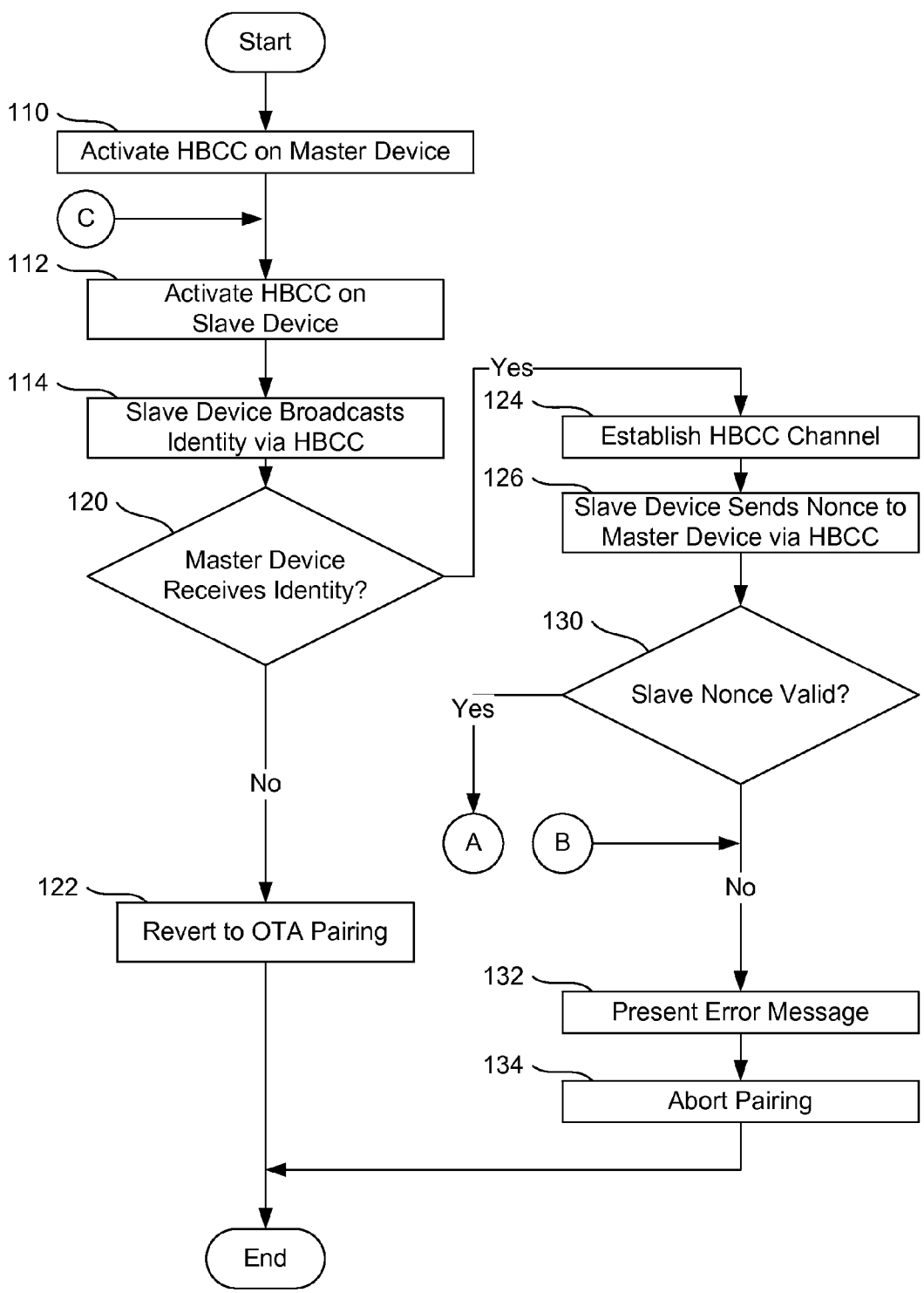
FIGS. 4A and 4B present a flowchart of an example process for operating a human body nonce system.
Figure 4B:
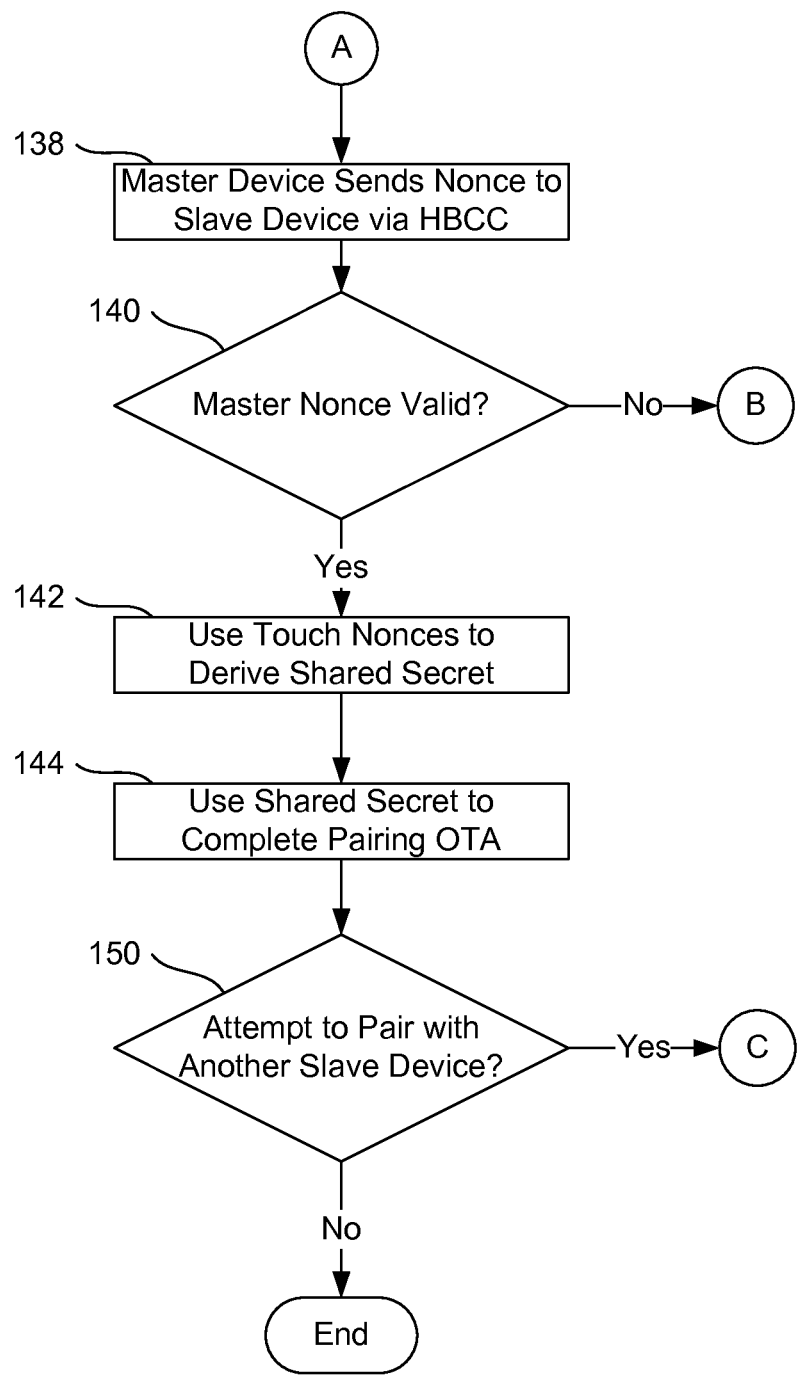

FIGS. 4A and 4B present a flowchart of an example process for operating an HBN system like system 10 of FIG. 1. That process may be referred to as the HBN pairing process or as the touch pairing process. In one embodiment, the HBN pairing process involves shared secrets that have sufficient entropy to ensure an adequate level of security. In particular, as described in greater detail below, both devices (a) generate random numbers and (b) share those random numbers with each other via the HBCC, as human body nonces (HBNs). A device may treat the HBN it has received (via the HBCC) as a shared secret, and the device may then use that shared secret to complete an in-band device pairing process. For instance, both devices may use the shared-secret HBNs to generate proof for authentication and as key material.

For example, the devices may use the HBNs to derive a key confirmation key (KCK), and the devices may use that KCK to authenticate each other. For instance, the devices may use the KCK to generate a keyed-hash message authentication code (HMAC) over a piece of data known to both parties (e.g., the two nonce values). Also, the devices may use the HBNs to derive a key encryption key (KEK), and the devices may use that KEK, directly or indirectly, to secure communications via an in-band protocol. Thus, the devices may use the HBNs to derive keys for encrypting and decrypting shared in-band communications.

In the embodiment of FIGS. 4A and 4B, the HBN pairing process progresses through different phases, with the first phase being an initialization phase. The initialization phase begins at block 110 with HBN module 26 activating HBCC capabilities of master device 20. For instance, HBN module 26 may automatically activate HBCC capabilities when master device 20 is turned on or when an application that could utilize the HBCC is launched. For instance, if master application 38 is a health application that is designed to receive health data (e.g., heart rate) from wearable devices via a secure communication channel, HBN module 26 may automatically activate HBCC capabilities when that health application is launched. Similarly, master application 38 could be a game application that is capable of sending output to a remote OHMD device OTA, but the game application may need to pair with the OHMD device first with the assistance of an HBCC. Consequently, HBN module 26 may automatically activate HBCC capabilities when that game application is launched, if an OHMD device is not already connected with master device 20. Alternatively, user 12 may use HBN module 26 to manually activate HBCC capabilities on master device 20.

In addition, HBN module 26 may provide user 12 with instructions for completing the HBN pairing process. For instance, if user 12 has launched an application on master device 20 that expects to communicate with a slave device such as slave device 50, HBN module 26 may provide the user with the following pairing instructions: (a) turn on the slave device, (b) press a pairing button on the slave device, and then (c) simultaneously touch the touch spots on the master device and the slave device.

As shown at block 112, the initialization phase also includes activating HBCC capabilities on slave device 50. For example, HBN module 56 may automatically activate HBCC capabilities in response to slave device 50 being turned on or in response to the pressing of pairing button 58. For instance, if slave device 50 is new, having just come out of its box, HBN module 56 may automatically activate HBCC capabilities when slave device 50 is powered on. But if slave device 50 had already been paired or bonded with a master device, HBN module 56 may not activate HBCC capabilities unless (a) a user presses pairing button 58 or (b) slave device 50 is unable to find the master device to which slave device 50 was previously bonded. As indicated below, a first device may be considered to be bonded with a second device if the first device includes wireless association data to identify the second device and to enable the first device to connect with the second device.

The HBN pairing process may then move from the initialization phase into a discovery phase. As part of the discovery phase, HBN module 56 may respond to activation of HBCC capabilities by automatically broadcasting a message via the HBCC that provides the identity and/or the address of slave device 50, as shown at block 114. Such a message may be referred to as a slave advertisement message or a slave identity message. In addition or alternatively, HBN module 56 may automatically broadcast a slave identity message in response to detecting via the HBCC that another device (e.g., master device 20) is present on the HBCC, or in response to receiving an advertisement inquiry message from a master device via the HBCC. Master device 20 and slave device 50 may send messages as one or more packets, for instance.

A slave identity message may include an identifier (ID) for slave device 50, an HBCC physical address for slave device 50, an alias for slave device 50, and/or other metadata if required. A slave device may use any suitable value as its ID. For instance, the ID could be the serial number of the device, it could be a number embedded by the manufacturer, some other vendor-specific value, or even a globally-unique identifier (e.g., an enhanced privacy ID (EPID)).

Also, as part of the discovery phase, HBN module 26 in master device 20 may start scanning for slave devices. As shown at block 120, HBN module 26 may then determine whether master device 20 has received a slave identity message via the HBCC. If a predetermined amount of time passes without master device 20 receiving a slave identity message via the HBCC, master device 20 may revert out of the HBN pairing process into a more or less conventional OTA pairing protocol, as shown at block 122. However, as shown at block 124, if master device 20 has received a slave identity message, HBN module 26 may use the data in the slave identity message to establish an HBCC channel to the identified slave device. That HBCC channel may also be referred to as an HBCC connection. In one embodiment, the HBN modules use an approach similar to the one used for Ethernet broadcast and discovery. For instance, the slave device may send out a broadcast packet. The master device may then receive the broadcast packet and send an acknowledgement (ack) to the slave device. The ack may contain the master's HBCC physical address. The slave device may then use the master's HBCC address in future communication to the master device.

After the HBCC channel has been established, the HBN pairing process may then move from the discovery phase into an HBCC key material exchange phase. As shown at block 126, in the HBCC key material exchange phase, HBN module 56 in slave device 50 may then generate an HBN and send that HBN to master device 20 via the HBCC. That HBN may also be referred to as a slave nonce. As indicated above, the slave nonce may include a random number and a timestamp. The slave nonce may identify which OTA communication protocols are supported by slave device 50. HBN module 56 may use one or more HBCC messages to send the slave nonce and the OTA communication protocol information to master device 20.

For example, in one embodiment, HBN module 56 in slave device 50 ("S") uses the HBCC channel to send master device 20 ("M") a first message ("M1"). M1 may consist of
  the ID ("ID_S") for slave device 50,
  the HBCC address ("HAddr_S") for slave device 50,
  the name of one or more in-band wireless protocol(s) ("WIB1") supported by slave device 50,
  the in-band wireless address ("WAddr_S") of slave device 50, and
  the HBN ("R_S") for slave device 50, where R_S includes a random number that has been dynamically generated by HBN module 56.

For instance, in one embodiment, M1 may be formally defined as follows:
M1: ID_S‖HAddr_S‖WIB1‖R_S In other embodiments, nonces may include other items. For instance, as indicated above, nonces may also include timestamps. In one embodiment, ID_S in M1 is different from the identity in the slave identity message that was sent before the HBCC channel between the master device and the slave device was established. For instance, the identity in the slave identity message may be the slave's HBCC physical address, while the ID_S in M1 may be a different identifier for the slave device.

As shown at block 130, in response to receiving the slave nonce from slave device 50, HBN module 26 in master device 20 may determine whether that nonce is valid. For example, the HBN modules may require nonces to have a predetermined format and to be fresh. A device may consider a nonce to be stale or not fresh if the nonce has the same value as any prior nonce that the device has ever received. Accordingly, an HBN module may save a list of all prior nonces in secure storage. Thus, HBN module 26 in master device 20 may require R_S to be different from any previous R_S from any previous slave nonces processed by master device 20. In other words, to consider a slave nonce to be valid, HBN module 26 may require the random number to be unique. As indicated below, HBN module 56 in slave device 50 may also impose the same kinds of requirements. These requirements may be used to discourage or defeat replay attacks.

If the slave nonce is not valid, HBN module 26 may present an error message to notify user 12 about a suspected replay attack, and HBN module 26 may terminate the pairing process, as shown at blocks 132 and 134. However, if the slave nonce is valid, HBN module 26 may then determine whether master device 20 supports any of the OTA protocols identified in M1. If master device 20 does not support any of those protocols, HBN module 26 may present an error message to notify user 12 about the lack of protocol support, and HBN module 26 may terminate the pairing process.

However, if M1 passes all validation checks, the illustrated process may pass to block 138 via page connector A. As shown at block 138, HBN module 26 may then generate another HBN, and HBN module 26 may send that nonce from master device 20 to slave device 50 via the HBCC channel. That nonce may be referred to as a master nonce. The master nonce may also identify which particular OTA communication protocol has been selected by HBN module 26 for subsequent OTA communications between master device 20 and slave device 50.

In particular, in one embodiment, HBN module 26 generates a second message ("M2") consisting of:
  ID_S,
  HAddr_S,
  R_S,
  the wireless protocol ("WIB2") selected by HBN module 26,
  the identifier ("MID") for master device 20,
  the HBCC address ("HAddr_M") for master device 20,
  the in-band wireless address ("WAddr_M") for master device 20, and
  the master nonce ("R_M").
For example, M2 may be formally defined as follows:
M2:     M_ID||HAddr_M||WAddr_M||R_M||S_ID||HAddr_S||WAddr_S||R_S||WIB2
HBN module 26 may send M2 to slave device 50 via the HBCC channel. Thus, M1 and M2 may be payload of the HBCC, on top of the HBCC link layer. By contrast, messages like the slave identity message and the corresponding ack from the master device may be link layer control messages.

As shown at block 140, HBN module 56 in slave device 50 may then determine whether the master nonce is valid. HBN module 56 may impose the same kinds of validity requirements as HBN module 26. If the master nonce is not valid, the illustrated process may pass to block 132 via page connector B, and the slave device 50 may present an error message and abort the pairing process, as shown at blocks 132 and 134.

Also, if one device does not receive a nonce from the other device within a predetermined period of time, the device detecting the timeout condition may revert out of the HBN pairing process into a more or less conventional OTA pairing protocol.

However, if the master nonce is valid, the HBN pairing process may then move from the HBCC key material exchange phase into an OTA pairing phase. During the OTA pairing phase, HBN module 26 and HBN module 56 may generate a common shared secret by applying a pseudo-random function (PRF) to some or all of the data that has been transmitted between master device 20 and slave device 50 via the HBCC, as shown at block 142. As described in greater detail below, the input to the PRF may include the slave nonce and the master nonce, for example. In one embodiment, HBN module 26 and HBN module 56 compute the common shared secret before performing any OTA communications with each other.

In one embodiment, the PRF is an HMAC function, and the key for that function is the hash value of the concatenation of R_M and R_S. Master device 20 and/or slave device 50 may then use the output of that function (i.e., that message authenticate code) as the password or key ("K_MS") for in-band wireless pairing. This approach may be formally defined as follows:
$k_{prf} \leftarrow$ hash (R_M||R_S)
K_MS$\leftarrow$prf($k_{prf}$, hash (M_ID||S_ID||HAddr_M||HAddr_S||WAddr_M||WAddr_S||WIB2)

For such an embodiment, the following items may each be considered a shared secret: R_M, R_S, the concatenation of R_M and R_S, and K_MS. Additional items that may be considered to be shared secrets include the key materials exchanged by an in-band key exchange protocol (e.g., the Diffie-Hellman protocol).

In other embodiments, HBN modules may use a PRF other than HMAC to generate the common shared secret.

Once each device has generated the common shared secret, master device 20 and slave device 50 may complete any further security configuration steps required to provide a secure OTA communications channel between master device 20 and slave device 50. For instance, the devices may use the common shared secret (e.g., HMAC) to authenticate themselves to each other, as a key for secure OTA communications, and/or as key material for generating a key for secure OTA communications.

For example, if master device 20 and slave device 50 have agreed on Bluetooth for the OTA protocol, master device 20 and slave device 50 may use the Bluetooth Secure Simple Pairing (SSP) protocol to complete the pairing process. In particular, master device 20 and/or slave device 50 may use the HMAC as the input for the so-called "Passkey Entry" association mode. For instance, master device 20 and slave device 50 may truncate K_MS to 20 bits and feed that truncated value to Bluetooth SSP Passkey Entry Mode. Master device 20 and slave device 50 may then complete Bluetooth SSP, achieving in-band mutual authentication, and setting up a long term key for secure communications of between applications on master device 20 and applications on slave device 50. Or if master device 20 has selected a Wi-Fi protocol for the OTA protocol, master device 20 and/or slave device 50 may use the key material (e.g., K_MS) to generate the password or "pre-shared key" for Wi-Fi Protected Access (WPA) or Wi-Fi Protected Access II (WPA2) protocols.

Also, when sharing data to complete the HBN pairing process, master device 20 and slave device 50 may use the selected OTA protocol, as shown at block 144. In other embodiments, the master device and the slave device may use new pairing protocols with mutual authentication and long term key generation, based on the shared secrets.

As shown at block 150, HBN module 26 may then determine whether master device 20 should attempt to pair with any additional slave devices via the HBCC. For instance, if master application 38 is a power control application for managing electricity usage in the home, master application 38 may provide a configuration function that allows user 12 to configure master application 38 with data describing a group of devices to be controlled by master application 38. That group of devices may be referred to as a device ensemble. After user 12 has defined the group ensemble, user 12 may select an option to put master application 38 into a "discover ensemble" mode. Master application 38 may then instruct the user to continue holding master device 20 (or a touch spot on master device 20) while successively touching a touch spot on each device to be included in the ensemble. For instance, if user 12 has defined an ensemble to consist of a thermostat and two light switches to be controlled by master device 20, master device 20 may first instruct the user to touch a touch spot on the thermostat, then a touch spot on the first light switch, and then a touch spot on the second light switch. Also, as each device is touched, master device 20 and that device may complete the pairing process as described above. And as each slave device completes the pairing process, master application 38 may provide user 12 with notification to indicate that a particular slave device has successfully paired with master device 20.

Thus, referring again to block 150, HBN module 26 may determine, for instance, whether all of the slave devices for a predefined device ensemble have been paired with master device 20. If any of those devices have not yet been paired with master device 20, the illustrated process may return to block 112 via page connector C. Then, additional pairings may be performed, as indicated above.

However, once all of the slave devices for the ensemble have been paired with master device 20, master application 38 may notify user 12 that the discovery mode has been successfully completed. User 12 may then confirm that he or she does not want to add any more devices to the ensemble. In response, master device 20 may leave discovery mode. The HBN pairing process may then end.

Master device 20 and slave device 50 may then use the secure OTA channel for secure communications. Likewise, if multiple slave devices (e.g., and device ensemble) have been paired with master device, all of the slave devices may use secure OTA channels for secure communication with master device 20.

In addition, master device 20 and each slave device 50 may perform a bonding phase, in which each device saves information from the pairing process to enable the devices to automatically pair with each other in the future.

For purposes of this disclosure, the body of user 12 serves as part of a body area network (BAN) for HBCC communications between master device 20 and slave device 50. By contrast, when master device 20 and slave device 50 use OTA communications, master device 20 and slave device 50 may be considered to be parts of a personal area network (PAN), a wireless local area network (LAN), or the like.

As described above, each slave device may send a nonce to a master device via the HBCC before the slave sends or receives any data from the master device OTA. Accordingly, the HBN pairing process may be considered to have an OTA phase (during which the devices communicate using OTA communication hardware) and a pre-OTA phase (during which the devices communicate via the HBCC). In particular, devices may share HBNs during the pre-OTA phase, and the devices may use those nonces to produce additional key material for device authentication and for secure communications.

Figure 5:
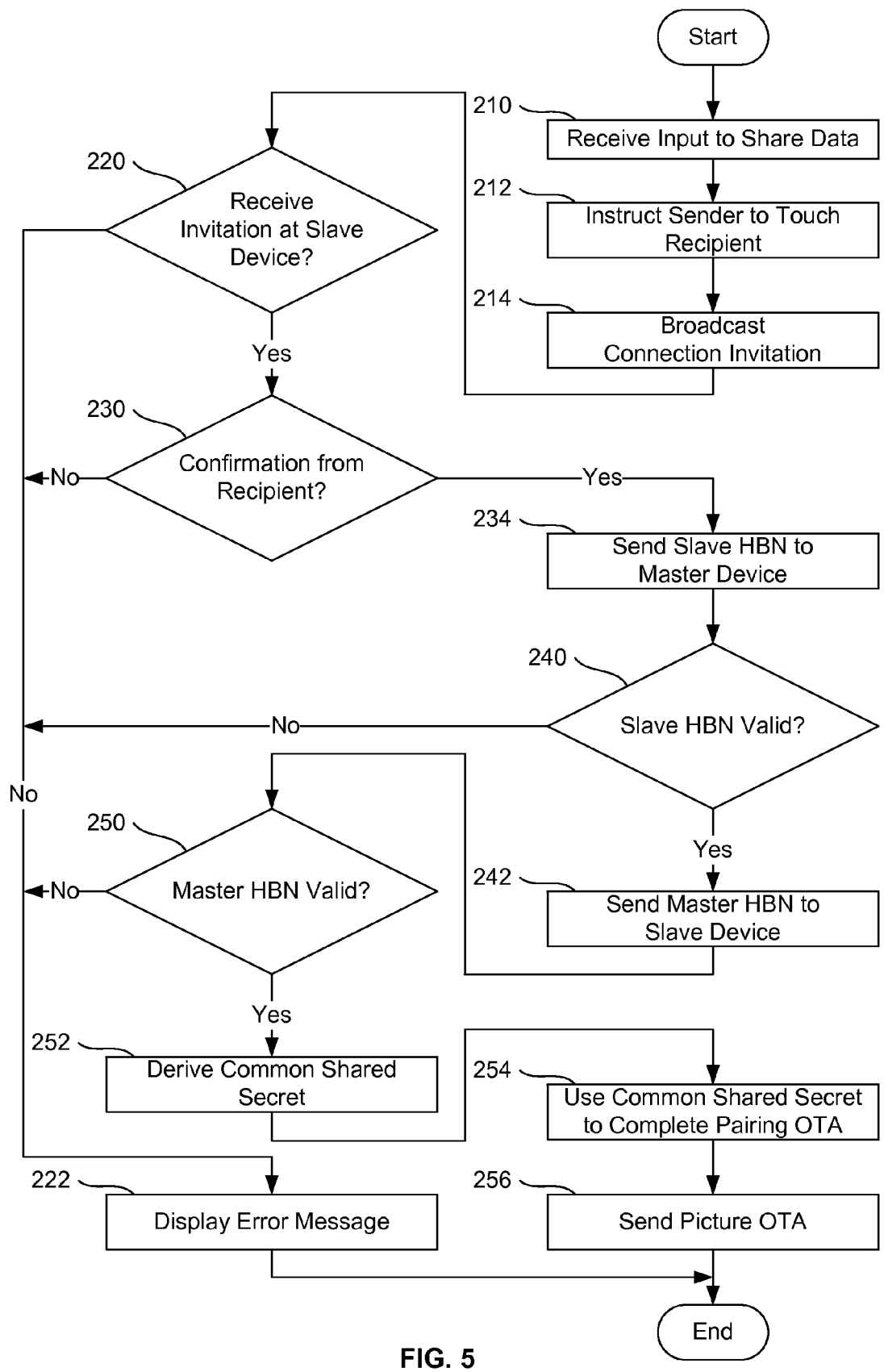
FIG. 5 is a flowchart of an example process for operating a human body nonce system involving two users.

FIG. 5 is a flowchart of an example process for operating an HBN system involving two users. For purposes of illustration, that process is described in the context of a first user ("Ann") sharing a picture with a second user ("Bob"). For instance, as described in greater detail below, Ann may send the picture from her smart phone to the smart phone of Bob. And even though both of those phones may have the same or similar software and hardware, for ease of reference, Ann's phone will be referred to as the master device or source device, and Bob's phone will be referred to as the slave device or target device. However, the master/source and slave/target roles could be reversed if Bob were to share a picture with Ann. Furthermore, the same kind of process may be used with many different kinds of devices and many different kinds of data.

In the embodiment of FIG. 5, the process starts with Ann using a camera application on the master device (her phone) to take a picture (e.g., a "selfie" of Ann and Bob) and then selecting a "share" option for that picture, as shown at block 210. In response, the master device instructs Ann to touch the recipient if she wants to use an HBCC to pair with the target device, as shown at block 212. In addition, an HBN module in the master device uses the HBCC to broadcast a connection invitation. The invitation connection may include data to identify the master device for HBCC communications, such as an HBCC address for the master device.

As shown at block 220, an HBN module in the slave device may then determine whether it has received a connection invitation. If the slave device does not receive the invitation, and the master device therefore never receives a response from the slave device via the HBCC, the master device may time out after a predetermined time, and the master device may therefore display an error message, as shown at block 222, and the master device may abort the sharing process. Alternatively, the master device may respond to an HBCC timeout by reverting to a different pairing approach, such as OTA pairing, for example.

Referring again to block 220, if the slave device receives the invitation from the master device, the process may pass to block 230, and the slave device may ask Bob to confirm that he wants to receive a picture from Ann. If Bob declines the invitation, the master device may time out and display an error message, and the master device may abort the sharing process, as indicated above with regard to block 222. If Bob accepts the invitation, the HBN module in the slave device may generate an HBN, and the HBN module may send that slave HBN to the master device via an HBCC, as shown at block 234. For instance, the slave device (and the master device) may use a process like the one described with regard to FIGS. 4A and 4B to generate and exchange HBNs, etc.

As shown at block 240, when the HBN module in the master device receives the slave HBN from the slave device, the HBN module in the master device may respond by determining whether that HBN is valid. For instance, as indicated above, the HBN module may determine whether the HBN is fresh. If the slave HBN is invalid, the master device may display an error message and abort the process, as described above with regard to block 222. If the slave HBN is valid, the HBN module in the master device may then generate another HBN, and the HBN module in the master device may send that master HBN to the slave device via the HBCC, as shown at block 242.

As shown at block 250, when the slave device receives the master HBN, the HBN module in the slave device may determine whether the master HBN is valid. If the master HBN is invalid, the slave device may display an error message and abort the process, as described above with regard to block 222. If the slave HBN is valid, the HBN modules in the master device and in the slave device may use some or all of the data from the master HBN and the slave HBN to derive a common shared secret, as shown at block 252. As shown at block 254, the master device and the slave device may then use the common shared secret to complete pairing OTA. As shown at block 256, the master device may then use the resulting in-band connection to send the selfie to the slave device. The process of FIG. 5 may then end.

In one embodiment, the master device and the slave device may use a process like the one described in FIGS. 4A and 4B to derive the common shared secret from the HBNs and to complete pairing.

As has been described, devices may use an HBCC during a pairing process. That process may provide protection against MITM attacks without requiring a user to enter an alphanumeric PIN or similar authentication data. For instance, the devices may automatically generate HBNs, and the devices may use the HBCC to share those HBNs.

In one or more embodiments, HBCC OOB pairing operations provide an auxiliary method for sharing data to be used for mutual authentication. For instance, devices may receive HBNs via the HBCC, and the devices may then use those nonces (or data derived from those nonces) to complete a pairing process OTA.

As indicated above, OTA communications are subject to interception by unauthorized devices. By contrast, since a user will presumable know which devices are actually on his or her body, there is much less risk of an unauthorized device intercepting HBCC communications, especially if the user is required to actually touch a specific device during the pairing process. Thus, the OOB channel may be presumed to be secure, in that all information transmitted via the HBCC is protected from eavesdropping, message injection, masquerade attacks, etc. Consequently, the teachings of the present disclosure provide a pairing protocol with both strong security and ease of use. In particular, the present teachings may be used to mitigate MITM attacks while providing a simple and enjoyable user experience for the pairing operations.

Master devices and slave devices may be wearable devices, to rest on or be attached to the bodies of their users. For instance, master devices and slave devices may be implemented (a) as jewelry such as bracelets, watches, rings, necklaces, amulets, (b) as part of clothing, or (c) as any other object which includes the necessary processing and communication resources and which can be worn in electrical communication with the user's body. HBN technology may also be placed within objects such as furniture or floor mats.

In some embodiments, HBN antennas may be used for pairing without direct contact with the skin of the user. For instance, a master device and/or a slave device may be worn or carried near the skin, with a gap of about six millimeters (6 mm) or less between the skin and the HBN antenna. For example, a master device may be carried in a user's pants pocket with the HBN antenna facing the user's leg, and a slave device may be worn affixed to the outside of the user's shirt with its the HBN antenna also facing the user's body. Similarly, a device with the technology described herein may be paired via HBCC while located in a backpack or a handbag. Likewise, HBN-enabled devices may allow the user to provide input while wearing gloves. However, in each case, operability will be subject to the limitation of the HBN antenna(s) in use.

In addition, master devices and slave devices may be handheld data processing devices such as smartphones, tablets, etc. Alternatively, master devices and slave devices may be larger data processing devices, such as laptop or desktop computers, entertainment devices such as televisions (TVs), etc. For instance, a user may use a touch spot on a laptop computer and a touch spot on a TV to pair the laptop and the TV via HBC.

Furthermore, the term "Internet of things" (IoT) refers to a system of devices that allows people to connect with remote objects. Master devices and slave devices according to the present disclosure may be considered part of the IoT. For example, the technology described herein may be used to connect "smarthome" appliances, exercise equipment, automobiles, and other devices, thereby making those devices part of the IoT.

For purposes of illustration, the present disclosure describes one or more example embodiments, but the present teachings are not limited to those particular embodiments. Other configurations are contemplated. For example, the disclosure mentions BT and BLE as possible OTA protocols for one or more embodiment, but those embodiments or other embodiment may use other types of OTA protocols in addition to or in place of BT or BLE. Those other OTA protocols may include, without limitation, the protocols known by the following names or trademarks: ZIGBEE, WI-FI DIRECT, etc.)

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. As indicated above, the present teachings may be used to advantage in many different kinds of data processing systems. Example data processing systems include, without limitation, distributed computing systems, supercomputers, high-performance computing systems, computing clusters, mainframe computers, minicomputers, client-server systems, personal computers (PCs), workstations, servers, portable computers, laptop computers, tablet computers, personal digital assistants (PDAs), telephones, smartphones, handheld devices, wearable devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a wearable device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, random access memory (RAM), and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with support for secure communications, the data processing system comprises a processing element and a machine accessible medium responsive to the processing element. In addition, the machine accessible medium comprises data which, when accessed by the processing element, implements a human body nonce (HBN) module that enables the data processing system to perform operations as a first device. Those operations comprise (a) dynamically generating a human body nonce (HBN); (b) sending the HBN from the first device to a second device via a human body communication conduit (HBCC); and (c) after sending the HBN to the second device, using the HBN to establish security for an over-the-air (OTA) communication session between the first device and the second device.

Example A2 includes the features of Example A1, and the operation of using the HBN to establish security for an OTA communication session between the first device and the second device comprises: (a) deriving a key, based at least in part on the HBN; and (b) using the key to encrypt communications to be sent OTA between the first device and the second device.

Example A3 includes the features of Example A1, and the operation of dynamically generating the HBN at the first device comprises using a random number generator to generate the HBN. Example A3 may also include the features of Example A2.

Example A4 includes the features of Example A1, and the HBN comprises a first HBN. Also, the first device operates as a slave device, and the second device operates as a master device. Also, the HBN module further enables the slave device to perform operations comprising: (a) after sending the first HBN from the slave device to the master device, receiving a second HBN from the master device at the slave device via the HBCC; and (b) after receiving the second HBN from the master device at the slave device, using the second HBN at the slave device to authenticate the master device. Example A4 may also include the features of one or more of Examples A2 and A3.

Example A5 includes the features of Example A1, and the HBN comprises a first HBN. Also, the first device operates as a slave device, and the second device operates as a master device. Also, the HBN module further enables the slave device to receive a second HBN from the master device at the slave device via the HBCC, after sending the first HBN from the slave device to the master device. Also, the operation of using the HBN to establish security for an OTA communication session between the slave device and the master device comprises using the first HBN and the second HBN to establish security for the OTA communication session. Example A5 may also include the features of one or more of Examples A2 through A4.

Example A6 includes the features of Example A5, and the HBN module further enables the slave device to perform operations comprising: (a) after receiving the second HBN from the master device at the slave device via the HBCC, automatically determining whether the second HBN matches any prior HBN received by the slave device; and (b) in response to a determination that the second HBN matches any prior HBN, automatically performing at least one operation from the group consisting of: (i) aborting the pairing process; and (ii) reverting to an OTA pairing protocol. Example A6 may also include the features of one or more of Examples A2 through A4.

Example A7 includes the features of Example A1, and the HBN module further enables the first device to perform operations comprising: (a) receiving a connection invitation at the first device from the second device via the HBCC; (b) in response to receiving the connection invitation, prompting a user of the first device to indicate whether the first device should receive data from the second device; and (c) receiving user input indicating that the first device should receive data from the second device. Also, the first device performs the operations of dynamically generating the HBN and sending the HBN from the first device to a second device via the HBCC in response to receiving the user input indicating that the first device should receive data from the second device. Example A7 may also include the features of one or more of Examples A2 through A6.

Example B1 is an apparatus with support for secure communications. The apparatus comprises a non-transitory machine accessible medium; and data in the machine accessible medium which, when accessed by a processor of a first device, implements a human body nonce (HBN) module. The HBN module enables the first device to perform operations comprising: (a) dynamically generating a human body nonce (HBN); (b) sending the HBN from the first device to a second device via a human body communication conduit (HBCC); and (c) after sending the HBN to the second device, using the HBN to establish security for an over-the-air (OTA) communication session between the first device and the second device.

Example B2 includes the features of Example B1, and the operation of using the HBN to establish security for an OTA communication session between the first device and the second device comprises: (a) deriving a key, based at least in part on the HBN; and (b) using the key to encrypt communications to be sent OTA between the first device and the second device.

Example B3 includes the features of Example B1, and the operation of dynamically generating the HBN at the first device comprises using a random number generator to generate the HBN. Example B3 may also include the features of Example B2.

Example B4 includes the features of Example B1, and the HBN comprises a first HBN. Also, the first device operates as a slave device, and the second device operates as a master device. Also, the HBN module further enables the slave device to perform operations comprising: (a) after sending the first HBN from the slave device to the master device, receiving a second HBN from the master device at the slave device via the HBCC; and (b) after receiving the second HBN from the master device at the slave device, using the second HBN at the slave device to authenticate the master device. Example B4 may also include the features of one or more of Examples B2 and B3.

Example B5 includes the features of Example B1, and the HBN comprises a first HBN. Also, the first device operates as a slave device, and the second device operates as a master device. Also, the HBN module further enables the slave device to receive a second HBN from the master device at the slave device via the HBCC, after sending the first HBN from the slave device to the master device. Also, the operation of using the HBN to establish security for an OTA communication session between the slave device and the master device comprises using the first HBN and the second HBN to establish security for the OTA communication session. Example B5 may also include the features of one or more of Examples B2 through B4.

Example B6 includes the features of Example B5, and the HBN module further enables the slave device to perform operations comprising: (a) after receiving the second HBN from the master device at the slave device via the HBCC, automatically determining whether the second HBN matches any prior HBN received by the slave device; and (b) in response to a determination that the second HBN matches any prior HBN, automatically performing at least one operation from the group consisting of: (i) aborting the pairing process; and (ii) reverting to an OTA pairing protocol. Example B6 may also include the features of one or more of Examples B2 through B4.

Example B7 includes the features of Example B1, and the HBN module further enables the first device to perform operations comprising: (a) receiving a connection invitation at the first device from the second device via the HBCC; (b) in response to receiving the connection invitation, prompting a user of the first device to indicate whether the first device should receive data from the second device; and (c) receiving user input indicating that the first device should receive data from the second device. Also, the first device performs the operations of dynamically generating the HBN and sending the HBN from the first device to a second device via the HBCC in response to receiving the user input indicating that the first device should receive data from the second device. Example B7 may also include the features of one or more of Examples B2 through B6.

Example C1 is a method for enabling devices to communicate securely. The method comprises: (a) dynamically generating a human body nonce (HBN) at a first device; (b) sending the HBN from the first device to a second device via a human body communication conduit (HBCC); and (c) after sending the HBN from the first device to the second device, using the HBN to establish security for an over-the-air (OTA) communication session between the first device and the second device.

Example C2 includes the features of example C1, and the operation of using the HBN to establish security for an OTA communication session between the first device and the second device comprises: (a) deriving a key, based at least in part on the HBN; and (b) using the key to encrypt communications to be sent OTA between the first device and the second device.

Example C3 includes the features of example C1, and the operation of dynamically generating the HBN at the first device comprises using a random number generator to generate the HBN. Example C3 may also include the features of Example C2.

Example C4 includes the features of example C1, and the HBN comprises a first HBN. Also, the first device operates as a slave device, and the second device operates as a master device. Also, the method further comprises: (a) after sending the first HBN from the slave device to the master device, receiving a second HBN from the master device at the slave device via the HBCC; and (b) after receiving the second HBN from the master device at the slave device, using the second HBN at the slave device to authenticate the master device. Example C4 may also include the features of one or more of Examples C2 and C3.

Example C5 includes the features of example C1, and the HBN comprises a first HBN. Also, the first device operates as a slave device, and the second device operates as a master device. Also, the method further comprises, after sending the first HBN from the slave device to the master device, receiving a second HBN from the master device at the slave device via the HBCC. Also, the operation of using the HBN to establish security for an OTA communication session between the slave device and the master device comprises using the first HBN and the second HBN to establish security for the OTA communication session. Example C5 may also include the features of one or more of Examples C2 through C4.

Example C6 includes the features of example C5, and the method further comprises: (a) after receiving the second HBN from the master device at the slave device via the HBCC, automatically determining whether the second HBN matches any prior HBN received by the slave device; and (b) in response to a determination that the second HBN matches any prior HBN, automatically performing at least one operation from the group consisting of: (i) aborting the pairing process; and (ii) reverting to an OTA pairing protocol. Example C5 may also include the features of one or more of Examples C2 through C4.

Example C7 includes the features of example C1, and the method further comprises: (a) receiving a connection invitation at the first device from the second device via the HBCC; (b) in response to receiving the connection invitation, prompting a user of the first device to indicate whether the first device should receive data from the second device; and (c) receiving user input indicating that the first device should receive data from the second device. Also, the first device performs the operations of dynamically generating the HBN and sending the HBN from the first device to a second device via the HBCC in response to receiving the user input indicating that the first device should receive data from the second device. Example C7 may also include the features of one or more of Examples C2 through C6.

Example D is at least one machine-accessible medium comprising computer instructions for enabling devices to communicate securely, wherein the computer instructions, in response to being executed on a data processing system, enable the data processing system to perform a method according to any of Examples C1 through C7.

Example E is a data processing system with support for secure communications. The data processing system comprises: (a) a processing element; (b) at least one machine-accessible medium responsive to the processing element; and (c) computer instructions stored at least partially in the at least one machine-accessible medium, wherein the computer instructions, in response to being executed, enable the data processing system to perform a method according to any of Examples C1 through C7.

Example F is a data processing system with support for secure communications. The data processing system comprises means for performing the method of any one of Examples C1 through C7.

What is claimed is:

1. A data processing system with support for secure communications, the data processing system comprising:
    a processing element;
    a machine accessible medium responsive to the processing element; and
    data in the machine accessible medium which, when accessed by the processing element, implements a human body nonce (HBN) module that enables the data processing system to perform operations as a first device, the operations comprising:
        dynamically generating a human body nonce (HBN);
        sending the HBN from the first device to a second device via a human body communication conduit (HBCC); and
        after sending the HBN to the second device, using the HBN to establish security for an over-the-air (OTA) communication session between the first device and the second device.

2. A data processing system according to claim 1, wherein the operation of using the HBN to establish security for an OTA communication session between the first device and the second device comprises:
    deriving a key, based at least in part on the HBN; and
    using the key to encrypt communications to be sent OTA between the first device and the second device.

3. A data processing system according to claim 1, wherein the operation of dynamically generating the HBN at the first device comprises using a random number generator to generate the HBN.

4. A data processing system according to claim 1, wherein:
    the HBN comprises a first HBN;
    the first device operates as a slave device;
    the second device operates as a master device; and
    the HBN module further enables the slave device to perform operations comprising:
        after sending the first HBN from the slave device to the master device, receiving a second HBN from the master device at the slave device via the HBCC; and
        after receiving the second HBN from the master device at the slave device, using the second HBN at the slave device to authenticate the master device.

5. A data processing system according to claim 1, wherein:
    the HBN comprises a first HBN;
    the first device operates as a slave device;
    the second device operates as a master device;
    the HBN module further enables the slave device to receive a second HBN from the master device at the slave device via the HBCC, after sending the first HBN from the slave device to the master device; and
    the operation of using the HBN to establish security for an OTA communication session between the slave device and the master device comprises using the first HBN and the second HBN to establish security for the OTA communication session.

6. A data processing system according to claim 5, wherein the HBN module further enables the slave device to perform operations comprising:
    after receiving the second HBN from the master device at the slave device via the HBCC, automatically determining whether the second HBN matches any prior HBN received by the slave device; and
    in response to a determination that the second HBN matches any prior HBN, automatically performing at least one operation from the group consisting of:
        aborting the pairing process; and
        reverting to an OTA pairing protocol.

7. A data processing system according to claim 1, wherein the HBN module further enables the first device to perform operations comprising:
    receiving a connection invitation at the first device from the second device via the HBCC;
    in response to receiving the connection invitation, prompting a user of the first device to indicate whether the first device should receive data from the second device; and
    receiving user input indicating that the first device should receive data from the second device; and
    wherein the first device performs the operations of dynamically generating the HBN and sending the HBN from the first device to a second device via the HBCC in response to receiving the user input indicating that the first device should receive data from the second device.

8. An apparatus with support for secure communications, the apparatus comprising:
a non-transitory machine accessible medium; and
data in the machine accessible medium which, when accessed by a processor of a first device, implements a human body nonce (HBN) module that enables the first device to perform operations comprising:
dynamically generating a human body nonce (HBN);
sending the HBN from the first device to a second device via a human body communication conduit (HBCC); and
after sending the HBN to the second device, using the HBN to establish security for an over-the-air (OTA) communication session between the first device and the second device.

9. An apparatus according to claim 8, wherein the operation of using the HBN to establish security for an OTA communication session between the first device and the second device comprises:
deriving a key, based at least in part on the HBN; and
using the key to encrypt communications to be sent OTA between the first device and the second device.

10. An apparatus according to claim 8, wherein the operation of dynamically generating the HBN at the first device comprises using a random number generator to generate the HBN.

11. An apparatus according to claim 8, wherein
the HBN comprises a first HBN;
the first device operates as a slave device;
the second device operates as a master device; and
the HBN module further enables the slave device to perform operations comprising:
after sending the first HBN from the slave device to the master device, receiving a second HBN from the master device at the slave device via the HBCC; and
after receiving the second HBN from the master device at the slave device, using the second HBN at the slave device to authenticate the master device.

12. An apparatus according to claim 8, wherein
the HBN comprises a first HBN;
the first device operates as a slave device;
the second device operates as a master device;
the HBN module further enables the slave device to receive a second HBN from the master device at the slave device via the HBCC, after sending the first HBN from the slave device to the master device; and
the operation of using the HBN to establish security for an OTA communication session between the slave device and the master device comprises using the first HBN and the second HBN to establish security for the OTA communication session.

13. An apparatus according to claim 12, wherein the HBN module further enables the slave device to perform operations comprising:
after receiving the second HBN from the master device at the slave device via the HBCC, automatically determining whether the second HBN matches any prior HBN received by the slave device; and
in response to a determination that the second HBN matches any prior HBN, automatically performing at least one operation from the group consisting of:
aborting the pairing process; and
reverting to an OTA pairing protocol.

14. An apparatus according to claim 8, wherein the HBN module further enables the first device to perform operations comprising:
receiving a connection invitation at the first device from the second device via the HBCC;
in response to receiving the connection invitation, prompting a user of the first device to indicate whether the first device should receive data from the second device; and
receiving user input indicating that the first device should receive data from the second device; and
wherein the first device performs the operations of dynamically generating the HBN and sending the HBN from the first device to a second device via the HBCC in response to receiving the user input indicating that the first device should receive data from the second device.

15. A method for enabling devices to communicate securely, the method comprising:
dynamically generating a human body nonce (HBN) at a first device;
sending the HBN from the first device to a second device via a human body communication conduit (HBCC); and
after sending the HBN from the first device to the second device, using the HBN to establish security for an over-the-air (OTA) communication session between the first device and the second device.

16. A method according to claim 15, wherein the operation of using the HBN to establish security for an OTA communication session between the first device and the second device comprises:
deriving a key, based at least in part on the HBN; and
using the key to encrypt communications to be sent OTA between the first device and the second device.

17. A method according to claim 15, wherein the operation of dynamically generating the HBN at the first device comprises using a random number generator to generate the HBN.

18. A method according to claim 15, wherein:
the HBN comprises a first HBN;
the first device operates as a slave device;
the second device operates as a master device; and
the method further comprises:
after sending the first HBN from the slave device to the master device, receiving a second HBN from the master device at the slave device via the HBCC; and
after receiving the second HBN from the master device at the slave device, using the second HBN at the slave device to authenticate the master device.

19. A method according to claim 15, wherein:
the HBN comprises a first HBN;
the first device operates as a slave device;
the second device operates as a master device;
the method further comprises, after sending the first HBN from the slave device to the master device, receiving a second HBN from the master device at the slave device via the HBCC; and
the operation of using the HBN to establish security for an OTA communication session between the slave device and the master device comprises using the first HBN and the second HBN to establish security for the OTA communication session.

20. A method according to claim 19, further comprising:
after receiving the second HBN from the master device at the slave device via the HBCC, automatically determining whether the second HBN matches any prior HBN received by the slave device; and in response to a determination that the second HBN matches any prior HBN, automatically performing at least one operation from the group consisting of:
aborting the pairing process; and
reverting to an OTA pairing protocol.

21. A method according to claim 15, further comprising:
receiving a connection invitation at the first device from the second device via the HBCC;
in response to receiving the connection invitation, prompting a user of the first device to indicate whether the first device should receive data from the second device; and
receiving user input indicating that the first device should receive data from the second device; and
wherein the first device performs the operations of dynamically generating the HBN and sending the HBN from the first device to a second device via the HBCC in response to receiving the user input indicating that the first device should receive data from the second device.

* * * * *